May 10, 1938. E. F. MILLER 2,117,115
KNITTING MACHINE
Filed April 19, 1935 9 Sheets-Sheet 1
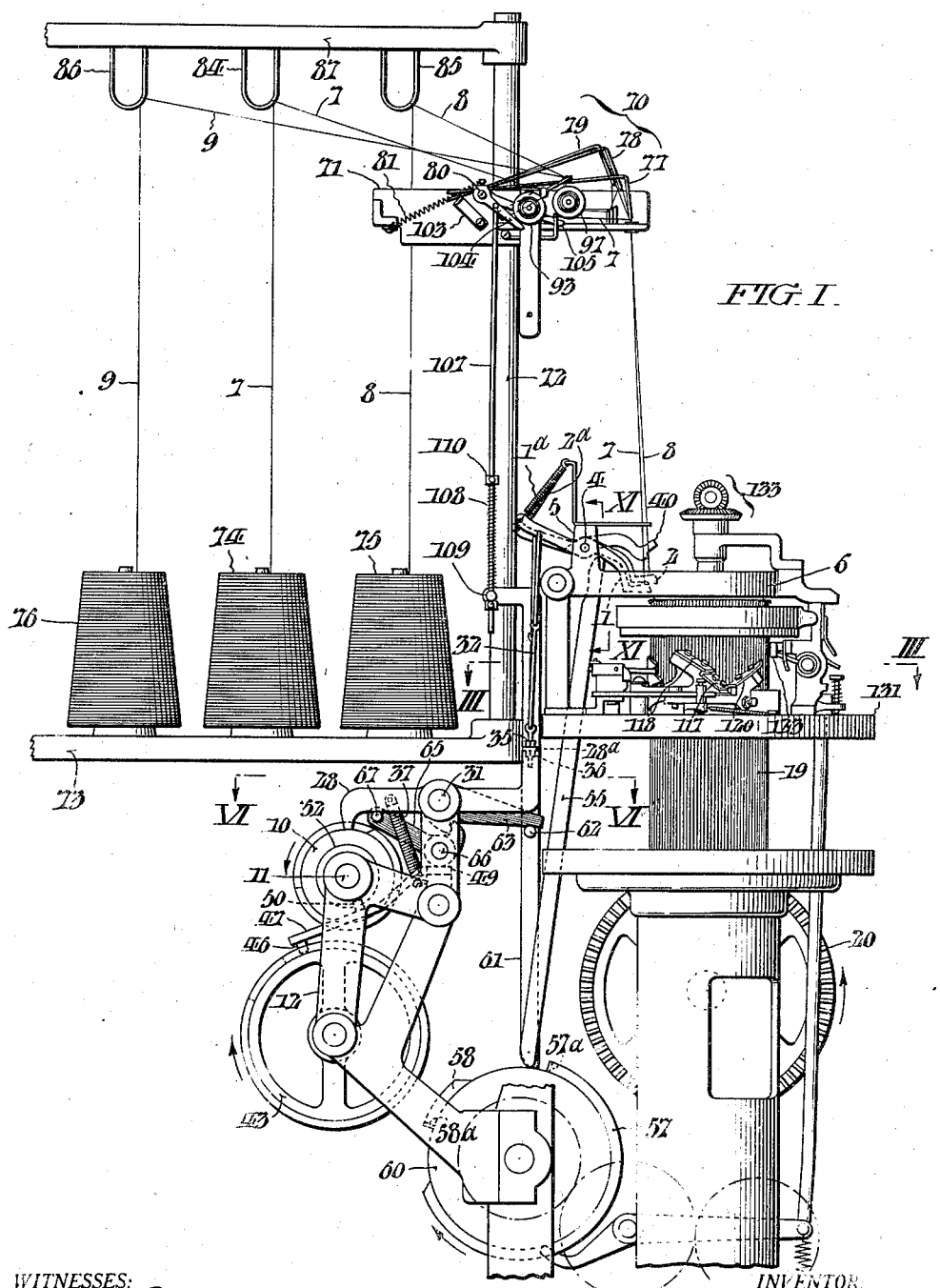
FIG. I.

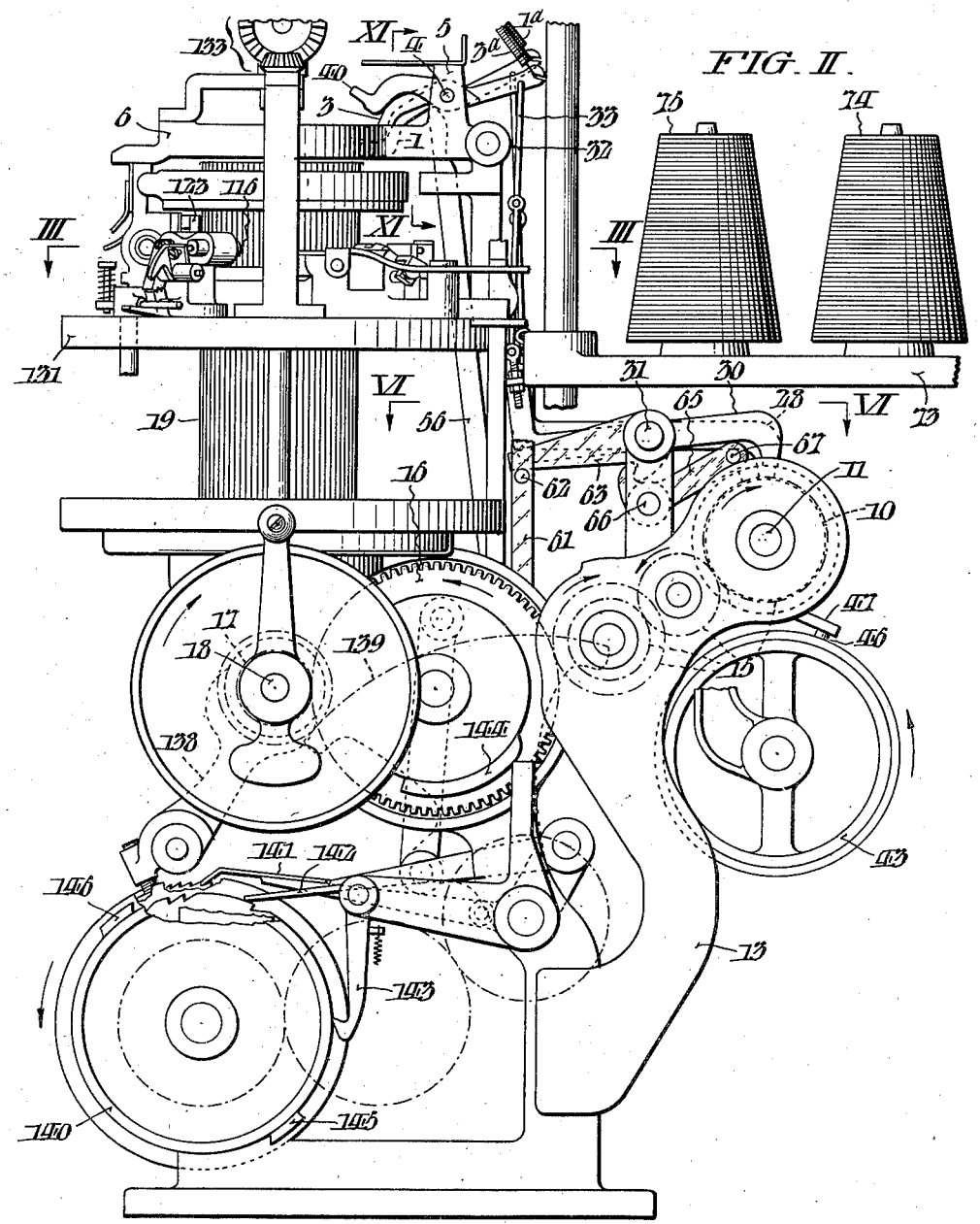

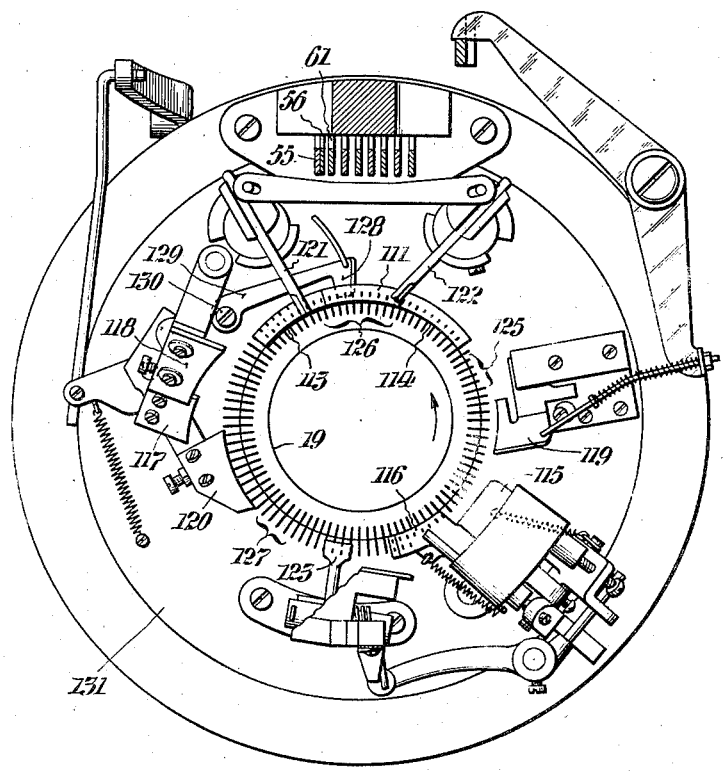

May 10, 1938.　　　　E. F. MILLER　　　　2,117,115
KNITTING MACHINE
Filed April 19, 1935　　　9 Sheets-Sheet 4
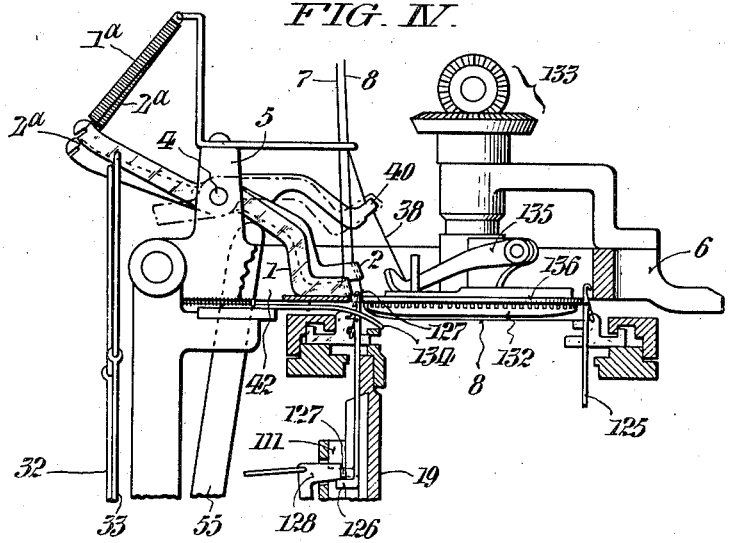
FIG. IV.
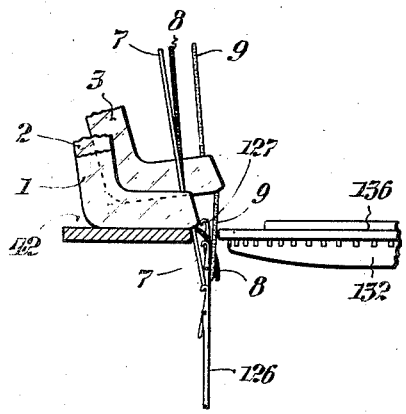
FIG. V.
WITNESSES:
John C. Bergner
Thomas W. Kerr, Jr.
INVENTOR:
Eugene F. Miller,
BY Fraley Paul
ATTORNEYS.

May 10, 1938.  E. F. MILLER  2,117,115
KNITTING MACHINE
Filed April 19, 1935    9 Sheets-Sheet 5
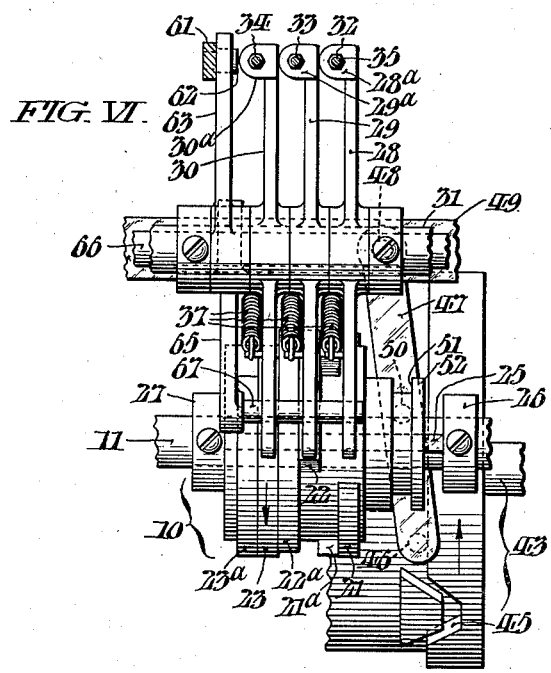
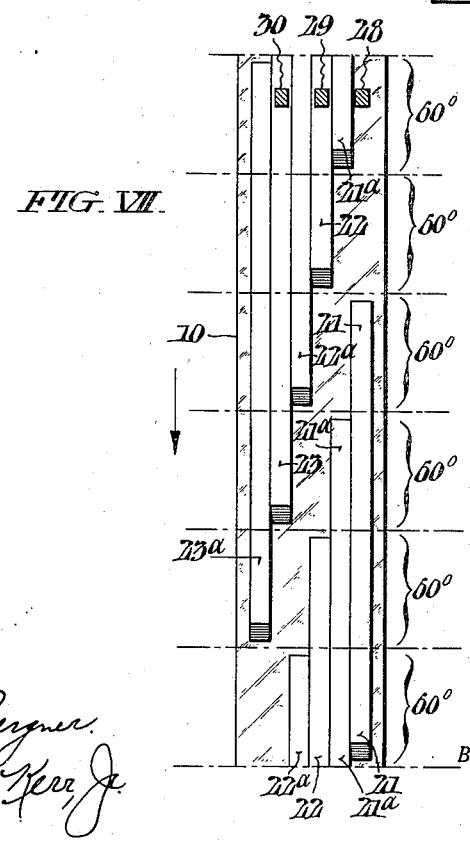
INVENTOR:
Eugene F. Miller,
BY Frailey Paul
ATTORNEYS.

May 10, 1938.  E. F. MILLER  2,117,115
KNITTING MACHINE
Filed April 19, 1935  9 Sheets-Sheet 6
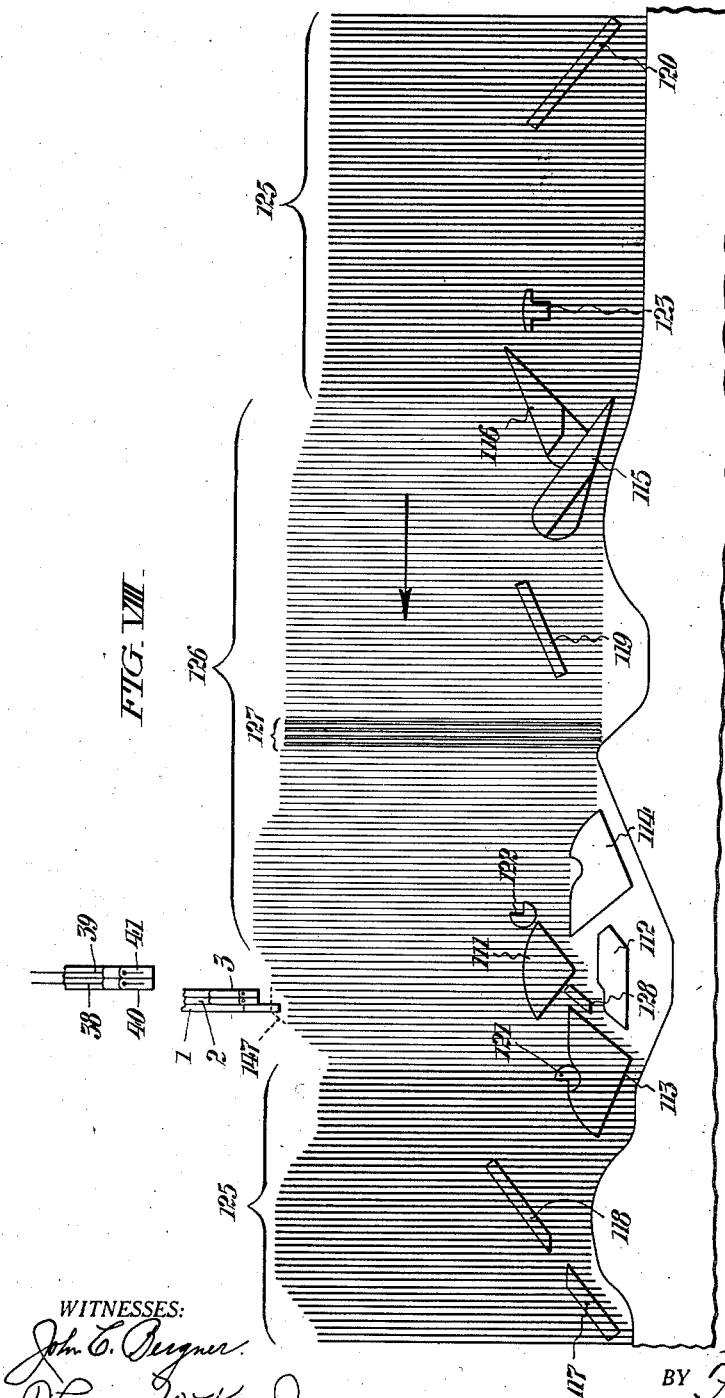

May 10, 1938.　　　E. F. MILLER　　　2,117,115
KNITTING MACHINE
Filed April 19, 1935　　　9 Sheets-Sheet 7
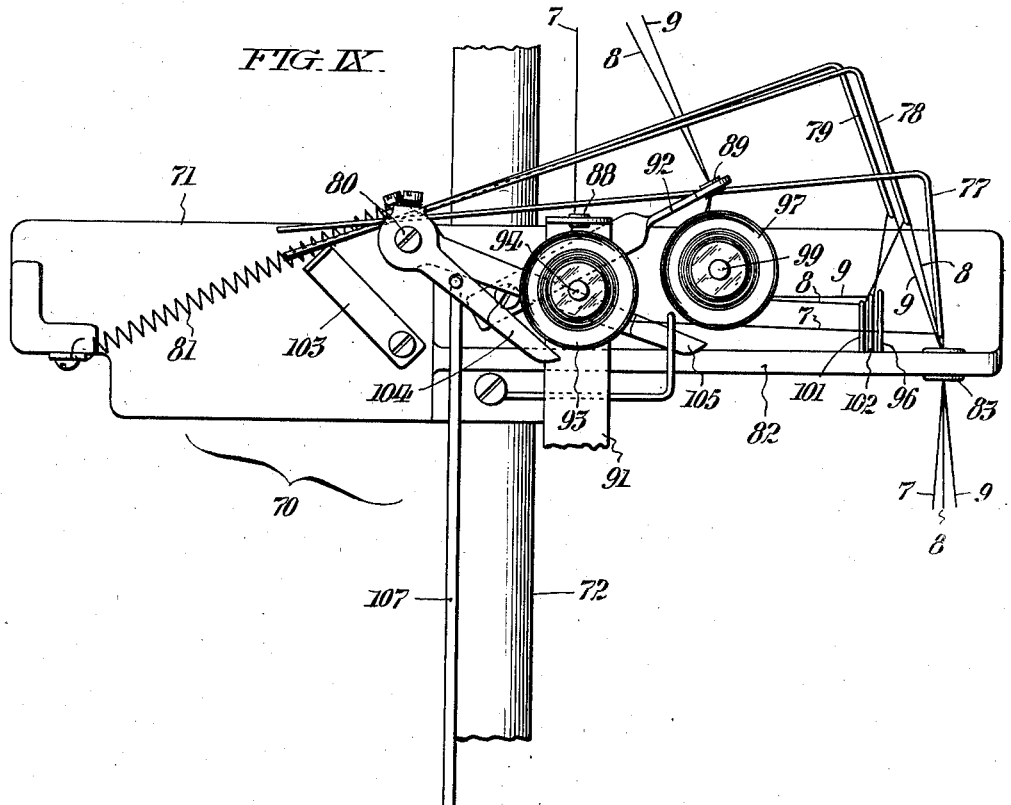
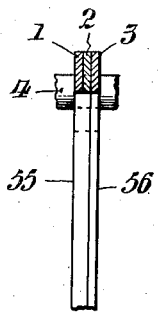
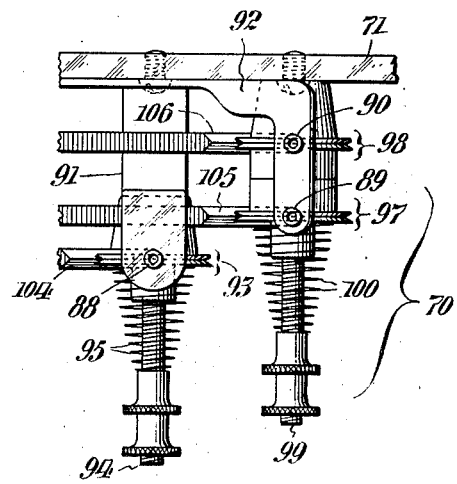
WITNESSES:
INVENTOR:
Eugene F. Miller,
BY
ATTORNEYS.

May 10, 1938.  E. F. MILLER  2,117,115
KNITTING MACHINE
Filed April 19, 1935  9 Sheets-Sheet 8
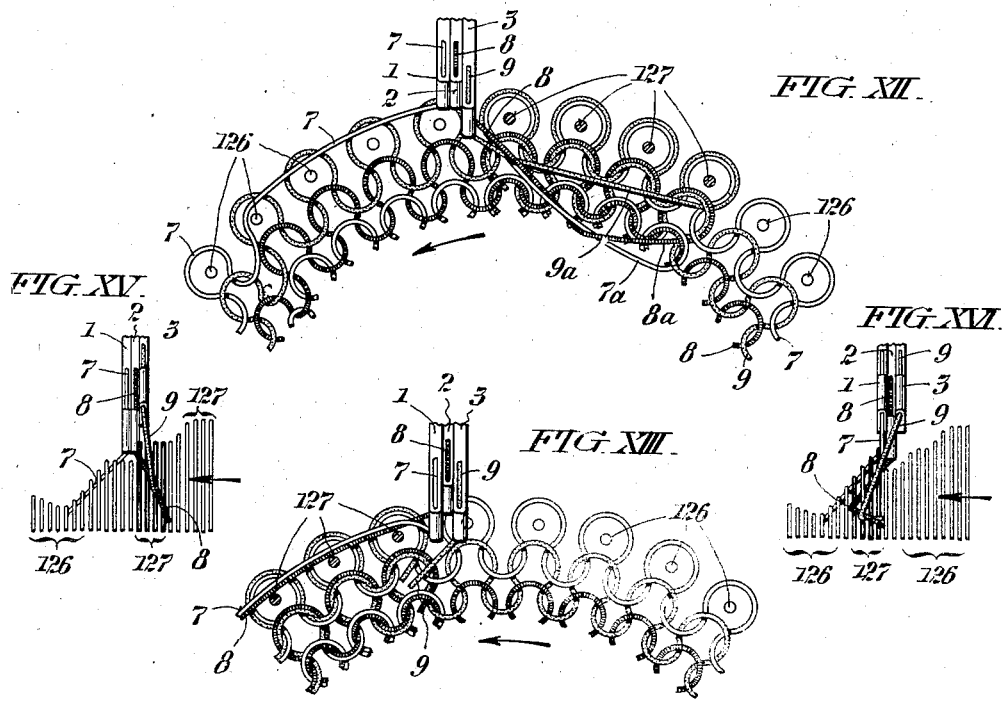
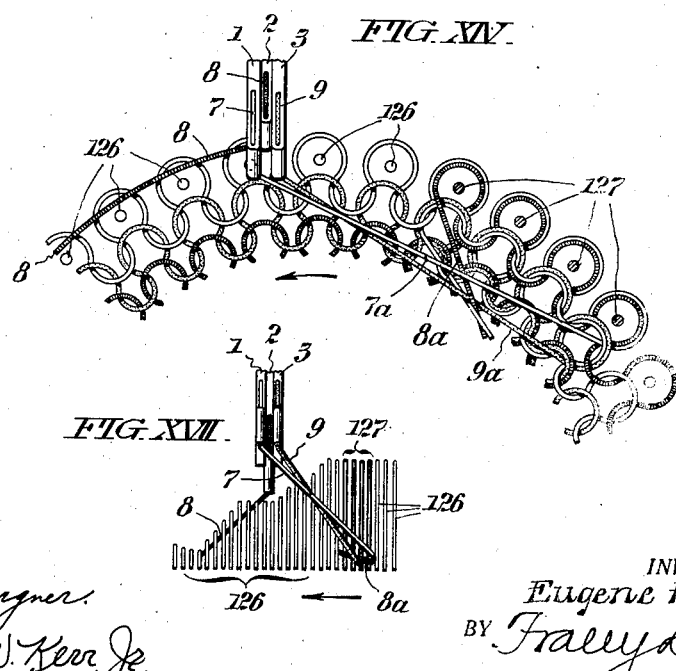
WITNESSES:
John C. Bergner
Thomas W. Kerr, Jr.
INVENTOR:
Eugene F. Miller,
BY Talley Paul
ATTORNEYS.

May 10, 1938. E. F. MILLER 2,117,115
KNITTING MACHINE
Filed April 19, 1935 9 Sheets-Sheet 9
FIG. XVIII.
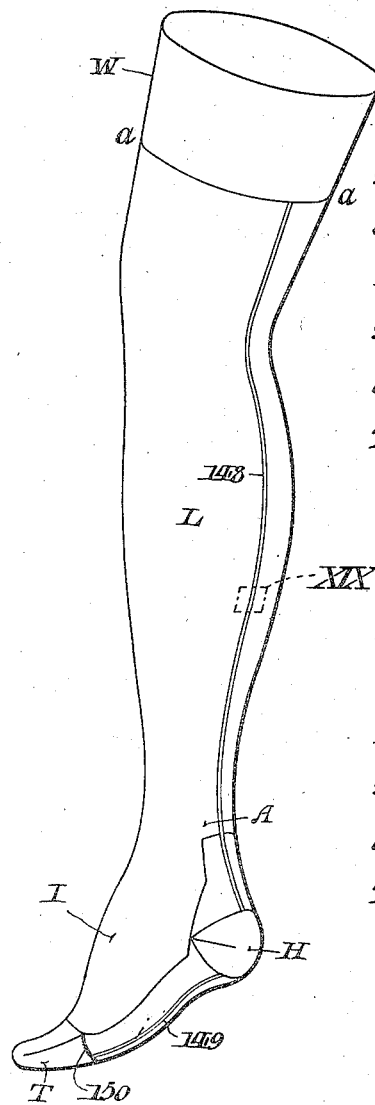
FIG. XIX.
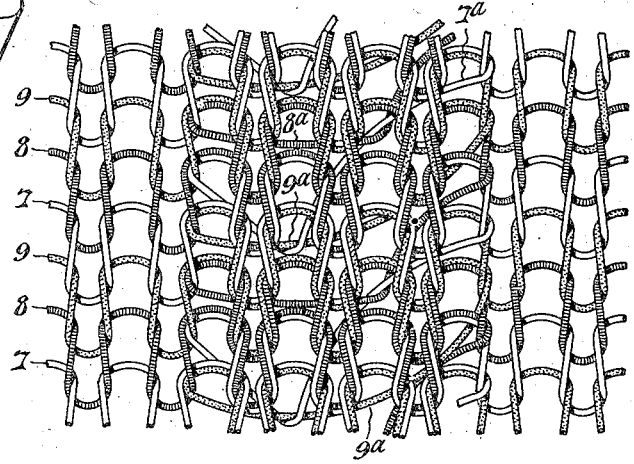
FIG. XX.
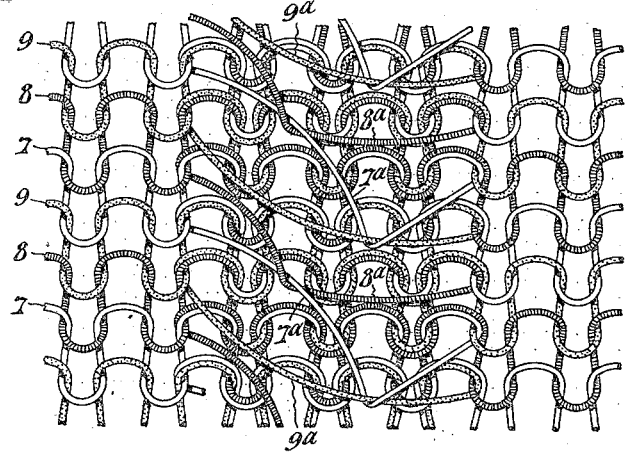
FIG. XXI.
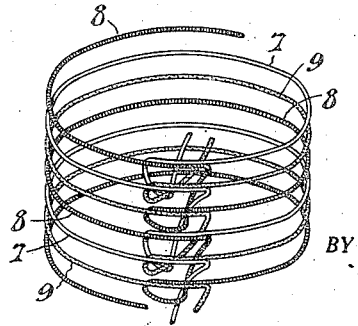
INVENTOR:
Eugene F. Miller, Patented May 10, 1938

2,117,115

UNITED STATES PATENT OFFICE 2,117,115

KNITTING MACHINE

Eugene F. Miller, Winston-Salem, N. C., assignor to Hanes Hosiery Mills Co., Winston-Salem, N. C., a corporation of North Carolina Application April 19, 1935, Serial No. 17,163

10 Claims. (Cl. 66—138)

This invention relates to knitting machines, particularly knitting machines for producing seamless tubular fabrics including hosiery and like articles.

The production of sheer hosiery under the usual methods on conventional types of seamless knitting machines, i. e. by continuously feeding a single, main or body yarn of very fine gauge silk or rayon to an endless series of needles, is attended by the formation of transverse streaks or rings in the fabric due to variations in the thickness or gauge of the thread, such imperfections being accentuated by contrast with the skin of the wearer when the stocking is worn, especially when the color of the thread used in the knitting is dark.

My invention has for its chief aim to overcome the above mentioned drawback, which desideratum I attain as hereinafter more fully set forth through provision in connection with seamless knitting machines, of mechanism for controlling a plurality of special interchangeable yarn feeds which serve individual main threads of the same nominal gauge, color and material in such manner that their yarns are fed in a predetermined repeating sequence to form successive single courses of the knitting, whereby the inherent irregularities in the yarns are effectively distributed with consequent elimination of the objectionable horizontal streaks or rings above referred to and formation of fabric, which, to all appearances, is perfectly uniform in texture.

Another object of my invention is to provide means for insuring interchange of the yarns consistently along a definite line longitudinally of the tubular fabric produced in the machine.

Another object of my invention is to provide in connection with yarn feeding mechanism having the described attributes and suitable for circular knitting machines producing stockings with heel and toe pockets at opposite sides of the knitted tubes, means to compensate for the circumferential shift of the needle cylinder in respect to its driving means at the completion of the heel pockets so that the longitudinal lines in which the interchange of yarns occurs will be correspondingly allocated in the leg and foot portions of the stocking.

Another object of my invention is to secure the foregoing advantages in a mechanism having the form of a simple attachment which can be readily incorporated in conventional types of seamless knitting machines without involving any changes whatever in the construction or normal mode of operation of such machines.

Still other objects and attendant advantages of this invention will be manifest from the detailed description following of the attached drawings, wherein Fig. I is a fragmentary view, in side elevation, of a conventional type of seamless stocking knitting machine embodying the present improvements.

Fig. II is a similar view of the opposite side of the machine.

Fig. III is a fragmentary cross sectional view taken as indicated by the arrows III—III in Figs. I and II, and showing more particularly the cams by which the needles of the machine are actuated.

Fig. IV is a fragmentary vertical sectional view of the top end of the needle cylinder of the machine and the parts adjacent thereto.

Fig. V is a fragmentary detail view also in vertical section but on a larger scale showing how the special feeds serve their yarns to the needles of the machine.

Fig. VI is a fragmentary plan sectional view, taken as indicated by the arrows VI—VI in Figs. I and II, showing the control means for the special yarn feeds.

Fig. VII is a development of a cam drum forming part of the feed control mechanism.

Fig. VIII is a linear development of the knitting cams and the needles of the knitting machine.

Fig. IX is a fragmentary detail view showing in side elevation the means for tensioning the main yarns fed by the special feeds.

Fig. X is a partial plan view of the tensioning means.

Fig. XI is a fragmentary detail sectional view taken as indicated by the arrows XI—XI in Figs. I and II.

Figs. XII, XIII and XIV are fragmentary diagrammatic plan views showing the action of the special feeds by which the main yarns are served to the needles of the knitting machine.

Figs. XV, XVI and XVII are fragmentary diagrammatic views in elevation corresponding to Figs. XII-XIV.

Fig. XVIII is a perspective view of a stocking produced on the machine.

Fig. XIX is a fragmentary view showing the texture of the fabric of the stocking within the confines of the dot-and-dash line square 19 in Fig. XVIII.

Fig. XX is a view corresponding to Fig. XIX showing the back face of the fabric; and, Fig. XXI is a diagrammatic view showing the relation in which the main yarns are incorporated in the fabric of the stocking.

The circular knitting machine herein delineated for convenience of illustrating my invention is of a well-known commercial type designed for the production of welt top seamless stockings, and embodying the various features set forth in U. S. Patents 1,152,850; 1,282,958; and 1,841,205; to which reference may be had for details purposely omitted from the drawings to avoid confusion and complication.

In accordance with this invention, there is provided a multiplicity of special yarn feeds, in the present instance three, which are respectively designated by the numerals 1, 2 and 3, these special feeds being substituted for certain of the regular yarn feeds of the machine and mounted for independent pivotal movement on the usual horizontal fulcrum pin 4 in upstanding lugs 5 of the latch guard ring 6. The three special feeds 1—3 are employed to serve individual main yarns 7, 8 and 9 which, for example, may be of very fine gauge silk, rayon or the like of the same nominal count and color for the knitting of sheer silk tubular fabric or stockings, and are adapted to feed their respective yarns in a predetermined sequence to form successive fabric courses. In order that they may be more easily distinguished from each other and from the yarn 7, the yarns 8 and 9 have been lined and stippled respectively in Figs. XII to XX. The means for actuating the special feeds 1—3 in opposition to individually-associated springs 1a, 2a and 3a (Figs. I, II and IV) includes a cam drum 10 on a shaft 11 which is journaled at its ends in fixed brackets 12 and 13 on the machine frame and continuously rotated through the medium of a train of gears 15 (Fig. II) from the "bull" wheel 16 of the machine, which latter in turn receives motion from an intermeshing pinion 17 on the main shaft 18 of the machine. The proportioning of the gears in the train 15 is such that the drum 10 is rotated once for every three revolutions of the needle cylinder 19 of the machine, which, during round and round knitting is driven at the same speed as the main shaft 18 by the usual bevel gear 20 on said shaft. From Figs. VI, VII it will be observed that the cam drum 10 has two sets of laterally spaced cam ridges 21, 22, 23 and 21a, 22a, 23a which are respectively interrupted by a circumferential interval slightly in excess of one hundred and twenty degrees corresponding to a little more than a single rotation of the needle cylinder; while as shown in Fig. VII, the respective cam segments of the two sets are circumferentially spaced by an angle substantially of sixty degrees, corresponding to a semi-rotation of the needle cylinder 19. As further shown in Fig. VI, the cam drum 10 has a spline connection 25 with the shaft 11 for capacity to be axially shifted between collars 26 and 27 on said shaft so that one or the other set of the segments 21—23 and 21a—23a may be employed to actuate cam followers having the form of fingers 28, 29 and 30, which are mounted for independent rocking movement on a fixed horizontal axis 31 supported by the bracket 12, said fingers being respectively coordinated with the special feeds 1—3 by articulated vertical links 32, 33 and 34 of wire or the like. From Figs. I, II and VI, it will be noted that the links 32—34 are adjustably connected to lateral ears 28a—30a on the tails of the fingers 28—30, the adjusting means consisting in each instance of a pair of clamp nuts 35 and 36 threaded on the lower components of the links and respectively engaging the ears of said fingers from above and below. The cam follower fingers 28—30 are subject to individual tension springs 37 whereby they are yieldingly urged toward the cam drum 10, see Figs. I and VI.

As above mentioned the three special feeds 1—3 feed the main yarns 7—9 incident to round and round knitting of the leg and foot or instep portions of the stockings. A heel and toe yarn 38, and a yarn 39 (Fig. VIII) for knitting the welts of the stockings are served by two of the usual feeds 40 and 41 of the machine, said feeds, as well as the special feeds 1—3 resting on the bottom of the throat 42 in the latch guard ring 6 when in feeding position, and being rendered inoperative when lifted to the high position shown in dot-and-dash lines in Fig. IV.

The axial shifting of the cam drum 10 is automatically controlled by the main cam drum 43, said drum 43 being intermittently stepped through a complete revolution for each knitting cycle after common practice in the art by suitable means not illustrated. The drum 43 is provided with cam segments which jointly afford a cam path with a lateral offset 45, see Fig. VI, to cooperate with a pendant stud 46 on a shifter arm 47 fulcrumed to swing on a stud 48 in a fixed bar 49 carried by the bracket 12. At an intermediate point the shifter arm 47 has an upstanding stud 50 engaging a circumferential groove 51 in the diametrically reduced end portion 52 of the drum 10. By this arrangement the cam drum 10 is axially shifted for a purpose hereinafter set forth relative to the fingers 28—30 whereby the special yarns feeds 1—3 are operated.

During the knitting of the welts and heels and toes of the stockings, the special feeds 1—3 are lifted out of action by a pair of thrust bars 55 and 56, see Figs. I, II and XI, both of which are actuated by two circumferentially spaced cam segments 57 and 58 on the yarn feed control drum 60 of the knitting machine, one of said bars controlling the feeds 1 and 2 and the other controlling the feed 3. It will be noted from Fig. I that the cam segments 57 and 58 of the drum 60 have side offsets at their tail ends as indicated at 57a and 58a so that the thrust bar 56 controlling the feed finger 3 is allowed to fall from said segments just slightly in advance of the thrust bar 55 which controls the feed fingers 1 and 2 for a reason later on explained. Another thrust bar 61 actuated by the feed control drum 60 is relied upon to concurrently lift the follower fingers 28—30 from the special cam drum and to hold them lifted during knitting of the heel and toe pockets of the stockings. The interposed instrumentalities which assist in the accomplishment of this function include a lateral pin 62 on the thrust bar 61, which pin engages beneath the tail of a lever 63 fulcrumed for independent movement on the axis 31 and having a cam hook in engagement with a cooperative cam hook on another lever 65. As shown, the lever 65 is pivoted on a stud 66 on the bracket 12 beneath said axis 31, and at its free end has a pin projection 67 which underreaches the three follower fingers 28—30. Thus, as the thrust bar 61 is lifted, the follower fingers 28—30 are raised clear of the special cam drum against the action of their springs 37.

The feeds 40 and 41 for the heel and toe yarn 38 and the welt yarn 39 are arranged to be actuated in a well known manner from the cam drum 60 through thrust rods indicated at 40a and 41a in Fig. III.

In accordance with the present invention there is further provided a special means for tensioning the three main yarns 7—9, this tensioning means being comprehensively designated by the numeral 70 in Fig. I, and illustrated in detail in Figs. IX and X. As shown, the tensioning means 70 comprises a bracket 71 which is adjustably fixed on a vertical stem or post 72 rising from the frame of the knitting machine and whereto is also secured the yarn cone support 73. Mounted on the support 73 are the cones 74, 75 and 76 from which the three main yarns 7, 8 and 9 are respectively drawn. The tensioning means 70 further comprises three tensioning fingers 77, 78 and 79 for the yarns 7, 8 and 9, which fingers are mounted for independent up and down movement on a stud 80 projecting laterally from the bracket 71. The yarn fingers 77—79 are individually subject to tension springs 81 tending to move them upward relative to three aligned guide eyes at the forward end of a horizontal flange 82 of the bracket 71, one of said eyes being shown at 83. Enroute from the cones 74—76, the yarns 7—9 pass upward to loop guides 84, 85 and 86 on the guide arm 87 at the top of the post 72, and from thence to eyes 88 and 89, 90 in supplemental guide members 91 and 92 secured to the bracket 71. As shown, the yarn 7, in leaving the eye 88, passes between a pair of tensioning disks 93 which are free on a stud 94 of the bracket 71 and subject to regulatable pressure of a spring 95, then through a loop guide 96 at the forward end of the bracket 72, and finally through the eye of the tensioning finger 77, on its way to the feed 1. In a similar manner, the yarns 8 and 9, in leaving the eyes 89 and 90, respectively pass between tension disks 97 and 98, both of which are mounted on a lateral stud 99 on the bracket and subject to the regulatable tension of a spring 100. From the tension disks 97 and 98 the yarns 8 and 9 first pass horizontally to individual loop guides 101 and 102 at the front end of the bracket 71, and then finally through the eyes of the tensioning fingers 78 and 79, enroute to the feeds 2 and 3. As shown in Fig. IX, the upward swing of the fingers 77—79 is limited by engagement of their tails with a stop member 103 on the bracket 71. In order that the yarns 7—9 may be relieved when the special feeds 1—3 are raised out of action, spreader fingers 104, 105 and 106 have been provided to separate the components of the tensioning disks 93, 97 and 98. These spreader fingers 104—106 are suitably connected together for concurrent swinging movement about the stud 80, and have sharp wedge edges at their ends to engage between the components of the tensioning disks 93, 97 and 98 in a manner which will be obvious from Figs. IX and X. As shown, one of the spreader fingers 104—106 is coordinated, by a rod 107, with the thrust bar 61 (Fig. I) hereinbefore referred to, with interposition of a spring 108 between a lateral stud 109 on the bar through which the rod passes, and a collar 110 secured to the rod above the upper end of the thrust bar. Thus, as the thrust bar 61 is elevated under control of the cam drum 60, the three spreaders are concurrently elevated from the position shown in Fig. IX whereby their knife edges are thrust between the tension disks for the purpose aforesaid.

The supply cones for the heel and toe yarn 38 and the welt yarn 39 are not illustrated, but may also be mounted on the support 73 as ordinarily.

The needle actuating cams of the machine correspond to those of the patents hereinbefore referred to and include upper and lower center cams 111 and 112, stitch cams 113 and 114 respectively at opposite sides of said center cams, as well as switch cams 115, 116, auxiliary elevating and depressing cams 117, 118, 119 and 120, lifting pickers 121 and 122, and a drop picker 123, all of which operate as described in Patent No. 1,841,205. The needles employed in the machine for the purpose of my invention include a long butt division 125 which is indicated by the heavy lines in Fig. VIII, and a medium butt division 126 which is indicated in light lines, these needles being respectively disposed at diametrically opposite sides of the needle cylinder 19. Medially of the medium butt series 126 there is a group 127 of special needles having butts slightly shorter than those of the medium butt needles, said special needles numbering four in the present instance. In addition to the cams already referred to, the machine is fitted with the usual "double sole divider" cam 128 which is formed at the end of a swinging arm 129 pivoted at 130 to the stationary upper bed plate 131 of the knitting machine, see Fig. III. The cam 128 is maintained in action during the knitting of the portion of the leg L of each stocking (Fig. XVIII) below the welt W as well as the instep portion I, but withdrawn from action during the knitting of the welt and during fashioning of the heel and toe pockets, in the usual way by suitable means (not shown) embodied in knitting machines of the type illustrated.

The lower disk 132 of the welting dial (Figs. IV and V) of the machine is driven in unison with the needle cylinder 19 by bevel gearing 133; and, incident to the formation of the stocking welts, the accumulating roll of fabric is depressed by the welt presser 134. The yarn clamp 135 is supported on the stationary upper disk 136 of the welting dial, and functions as ordinarily to hold the severed ends of the body yarns 7—9 as well as of the heel and toe yarn 38 and the welt yarn 39 when the feeds 1—3 and 40, 41 are raised to the high idle level.

The usual mechanism for changing from rotary to reciprocating knitting and vice versa is like that of Patent No. 1,841,205 and includes, as shown in Fig. II, an arm 138 to shift the clutch collar (not illustrated) on the main shaft 18 so that during the knitting of the heel and toe pockets of the stockings, the needle cylinder 19 is oscillated by the swinging gear sector which is indicated in dotted lines at 139. The arm 138 is actuated by the clutch control drum 140 which is intermittently racked as ordinarily by the pawls 141 and 142 so as to be rotated through a complete revolution during each knitting cycle. At the completion of each heel pocket by reciprocatory knitting with the medium butt needles 126 a hook pawl 143 (Fig. II) actuated by a lug 144 on the bull gear 16, by cooperation with a projection 145 on the clutch drum 140, gives a quick shift to the latter for transposal of the knitting cylinder 19 one hundred and eighty degrees from the normal relation to its driving mechanism so that the toe pocket can be subsequently knit upon the long butt needles 125. In a similar manner at the completion of each toe pocket, the hook pawl 143, by cooperation with another projection 146 on the clutch control drum 140 is instrumental in causing the restoration of the needle cylinder to its normal position relative to the driving mechanism of the machine.

The operation of the machine is as follows:—

Let it be assumed that the welt W of the stocking shown in Fig. XVIII has been knit in the known manner from the yarn 39 fed by the regular feed 41 down to the line a—a. At this point, the feed 41 is withdrawn from action under control of the cam drum 60, and incident to the same shift of said drum, the thrust rods 55 and 56 drop off the cam segment 58 with attendant lowering of the cam follower fingers 28—30 and of the special feeds 1—3, the feed 3 being lowered slightly in advance of the feeds 1 and 2 by virtue of the side offset 58a at the tail end of said cam segment. The timing of this action is such that the finger 30 contacts with the surface of the drum 10 immediately beyond the tail end of the segment 23. Accordingly, the feed 3 immediately assumes its active position to feed its yarn 9 to the needles of the machine, while the fingers 1 and 2 are held raised by engagement of the corresponding control fingers 28 and 29 with the segments 21 and 22 of the cam drum. Thereupon, by continuous rotation of the cam drum 10, the fingers 1—3 are constantly interchanged, in this instance in the order of their numbering (see Fig. XXI) throughout the round and round knitting of the leg L and ankle A of the stocking, each of said feeds being maintained in action for slightly more than a complete revolution of the needle cylinder 19 by virtue of the aforedescribed proportioning and arrangement of the segments 21—23 of said drum, with the result that the yarns of adjacent courses overlap on the special needles 127 as shown in Figs. XII-XIV in the exact manner about to be explained. Referring to Figs. IV and VIII, as the long and medium butt needles 125 and 126 encounter the double sole divider cam 128, they are depressed immediately in advance of the yarn feeding point, while the special needles 127 having the shortest butts will skip said cam and not be depressed until they encounter the stitch cam 113, said special needles thus following a different path as shown in dotted lines at 147 in Fig. VIII. The interchanging of the special feeds 1—3 is so timed in respect to the movements of the needle cylinder 19 that it occurs during the interval when the special needles 127 pass the feed point. This action will be best understood from Figs. XII-XVII to which reference will now be had. In Figs. XII and XV, the special feed 1 is still in action and the feed 2 has just dropped and in so doing has laid its yarn 8 crosswise of the needle circle immediately in advance of the special needles 127 leading in the direction of rotation of the needle cylinder 19 which is indicated by arrows in the several figures. By continued rotation of the needle cylinder the yarns 7 and 8 are concurrently fed to the special needles 127, until, when the last needle of this group arrives at the position shown in Figs. XIII and XVI, the feed 1 is raised out of action whereby the yarn 7 is carried to the inside of the needle circle immediately behind said last special needle, the feed 2 thereafter remaining in action for knitting of the next course of the fabric, incident to which the yarn 7 just idled is depressed by the welt depresser 134 and so directed beneath the welting dial 132 of the machine and floated behind the needles 127 as at 7a at the completion of the current course of the knitting as shown in Figs. XIV and XVII. In the same manner, at the initiation of the following course of the knitting, the feed 3 is inserted into action so that its yarn 9 is taken by the first of the special needles 127, and the feed 2 withdrawn immediately after the passing of the last needle of the group 127. By continuous repetitions of this cycle it will be seen that single courses of the fabric are formed from the yarns 7, 8 and 9 in succession in a predetermined order as diagrammatically shown in Fig. XXI with the yarn of adjacent courses interknitted by the four special lap needles 127 along a definite longitudinal line 148 down the back of the leg and ankle portions L and A of the stocking and floated at the inside of the fabric as shown at 7a, 8a and 9a in Figs. XIX, XX and XXI. During the knitting with the main yarns 7—9 these yarns are maintained at an even tension by the means 70 to insure the formation of uniform fabric loops by the needles of the machine.

At the completion of the ankle A of the stocking, a shift of the clutch control drum 140 causes the machine to go into oscillation, while incident to a concurrent shift of the feed control drum 60, the thrust bars 55 and 56 are raised, with attendant lifting of the fingers 28—30 from the special drum 10, elevation of the special feeds 1—3 to the high inoperative position, release of the tension upon the yarns 7—9 through separation of the components of the tension disks 93, 97 and 98 by the spreaders 104—106, and lowering of the feed 41 to deliver its yarn 39 to the medium and short butt needles 126 and 127 for the fashioning of the heel pocket H of the stocking which is about to ensue. As the special feeds 1—3 are rendered inoperative, their yarns 7, 8 and 9 are of course automatically severed and the cut ends caught beneath the yarn clamp 135 of the machine, likewise as ordinarily. By slacking the main yarns 7—9 during idling of the feeds 1—3, as above explained, I insure against their being pulled from beneath the yarn clamp 135 and losing their knitting positions at the times when the heel and toe yarn 38 and the welt yarn 39 are withdrawn for service in the knitting.

By a shift of the clutch control drum 140 during knitting of the last course of the heel pocket H, the projection 145 on said drum is brought into the path of, and engaged by, the hook pawl 143. As a consequence, a quick additional movement is imparted to the drum 140 whereby the positional relation between the needle cylinder 19 and its drive means is altered to the extent of one hundred and eighty degrees from the normal just as the machine is restored to rotation in readiness to proceed with the round and round knitting of the instep I of the stocking. At the moment of change from oscillation back to rotation, a rotative shift of the feed control drum 60 causes the heel and toe yarn feed 40 to be taken out of action, the fingers 28—30 being at the same time permitted to drop back into engagement with the cam drum 10, the feeds 1—3 released, and the spreaders 104—106 withdrawn from the tension disks to restore the tension upon the main yarns 7—9. Knitting of the instep I proceeds in the same manner as described in connection with the knitting of the leg L of the stocking except that now the special needles 127 pass the feed point a half revolution earlier or later as the case may be. In order to compensate for this change, the special feed control drum 10 was axially shifted rightward in Fig. VI at the time of the transition of the machine from oscillation to rotation through actuation of the shifter arm 47 by the cam offset 45 of the cam drum 43 whereby the substitute cam ridges 21a—23a on said drum 10 are positioned in line with the fingers 28—30 by which the special feeds 1—3 are actuated. Accordingly, through this provision the operation of the special feeds 1—3 is timed so that the interchange of yarns occurs as before at the moment when the special needles 127 pass the feed point. Thus, during the knitting of the instep I of the stocking, the interchange of the main yarns 7—9 occurs along a longitudinal line 149 that coincides in position with the line 148 in the leg L.

At the completion of the instep I, by a shift of the clutch drum 140, the action of the machine is again changed from rotation to oscillation; and by a concurrent shift of the drum 60, the heel and toe yarn feed 40 is once more placed into action, the special feeds 1—3 taken out of action and the tension on the yarns 7, 8 and 9 again relieved through separation of the tension disks 93, 97 and 98 by the spreaders 104—106. Fashioning of the toe pocket T thereupon proceeds on the long butt needles 125, at the side of the tube opposite the heel pocket H. During the knitting of the last course of the toe pocket T, the clutch control drum 140 is given a shift whereby the projection 146 thereon is brought into the path of the hook pawl and said drum given an additional quick shift as before with restoration of the needle cylinder 19 to its normal relation in respect to the drive mechanism of the machine in readiness for the starting of a new stocking. During the last described transition from oscillation to rotation, the special cam drum 10 is axially shifted back to its original position concurrently with replacement of the needle cylinder to the normal in respect to the driving means. The advance heel, heel, sole and toe portions of the stocking may be reinforced as conventionally indicated in Fig. XVIII by employment of a splicing or plating yarn in addition to the aforedescribed yarns employed incident to the knitting of these portions of the stockings. The stocking is finished by looping the toe opening across the bottom of the foot as indicated at 150 in Fig. XVIII, and if desired, a continuous seam may be formed at the back of the stocking by a suitable sewing machine to cover the lines 148 and 149 in which the yarns 7—9 overlap.

From the foregoing it will be apparent that I have provided a very simple and efficient mechanism in the form of an attachment, which makes possible the production of seamless ringless stockings on conventional types of knitting machines without necessitating any changes whatever in the construction or normal mode of operation of such machines.

While the stockings of improved appearance can be produced by the interchange of two main yarns of the same nominal gauge, color and material in accordance with the principle of my invention, for attainment of the best and most satisfactory results, the use of at least three such yarns as herein set forth, is advisable. Moreover, while I have herein, by way of example, suggested the use of four special short butt lap needles, the number of such needles may obviously be increased or decreased, and said lap needles may be allocated otherwise than at the center of the medium butt division of the needles if found convenient or desirable in practice.

Although intended more especially for the knitting of ringless seamless hosiery, the mechanism of my invention can also be employed advantageously in the production of horizontally striped novelty hosiery by using differently colored or contrasting yarns in the special feeds 1—3.

Having thus described my invention, I claim:

1. In a circular knitting machine adapted for rotary and oscillatory knitting to produce seamless stockings with fashioned heel and toe pockets, a cylinder with needles; drive means for the cylinder; knitting cams to actuate the needles; means whereby, at the completion of a heel pocket, the needle cylinder is shifted circumferentially relative to its drive means through an angle of one-hundred and eighty degrees from the normal; a plurality of interchangeable yarn feeds respectively adapted to feed individual yarns during the rotary phases of the knitting; means for actuating the feeds respectively during round and round knitting of the stocking legs and insteps so that said feeds are rendered active to feed their yarns for successive single courses of the fabric in a predetermined sequence; and means for changing the timing of the special feed actuating means concurrently with the shift of the needle cylinder as aforesaid so that interchange of the feeds occurs along corresponding longitudinal lines in the leg and the instep portions of the stockings.

2. In a circular knitting machine adapted for rotary and oscillatory knitting to produce seamless stockings with fashioned heel and toe pockets, comprising a cylinder with needles; drive means for the cylinder; knitting cams to actuate the needles, means whereby, at the completion of a heel pocket, the needle cylinder is positionally shifted circumferentially relative to its drive means through an angle of one hundred and eighty degrees from the normal; a multiplicity of interchangeable yarns respectively adapted to feed individual yarns during the rotary phases of the knitting; a constantly rotary cam drum with two sets of circumferentially-spaced segments, one set to actuate the feeds aforesaid so that they are rendered active to feed their yarns for successive single courses of the fabric in a predetermined sequence during the knitting of the stocking legs, and the other set for similarly actuating the feeds during knitting of the stocking insteps; and means for axially shifting the cam drum for substitution of one set of its segments for the other concurrently with the shift of the needle cylinder as aforesaid so that interchange of the yarn feeds occurs along corresponding longitudinal lines in the leg and instep portions of the stockings.

3. In a circular knitting machine adapted for rotary and oscillatory knitting to produce seamless stockings with heel and toe pockets, a cylinder with needles including divisions of needles at diametrically opposite sides of the cylinder for respectively knitting the heel and toe pockets of the stockings, and a special group of needles within one of the subdivisions aforesaid; drive means for the cylinder; means whereby at the completion of a heel pocket the needle cylinder is shifted circumferentially relative to its drive means through an angle of one hundred and eighty degrees so that a toe pocket can be formed on the diametrically opposite division of the needles; a plurality of interchangeable feeds for feeding individual yarns; means for actuating the feeds respectively during the knitting of the stocking legs and insteps so that they are rendered active to feed their yarns for single courses of the knitting in a predetermined repeating sequence; and means for changing the timing of the feed actuating means concurrently with shifting of the needle cylinder as aforesaid so that interchange of the feeds occurs along corresponding longitudinal lines in the leg and instep portions of the stockings.

4. In a circular knitting machine adapted for rotary and oscillatory knitting to produce seamless stockings with heel and toe pockets; a cylinder with divisions of needles at diametrically opposite sides thereof for respectively knitting the heel and toe pockets of the stockings, one of said divisions including a special group substantially in the middle of the series; cams to actuate the needles; drive means for the cylinder; means whereby the cylinder is shifted circumferentially relative to its drive means through an angle of one hundred and eighty degrees at the completion of the heel pocket upon one division of the needles so that the toe pocket can subsequently be knit upon the other division of the needles; a plurality of interchangeable feeds for feeding individual yarns; a rotating drum with two sets of angularly-spaced cam segments, one to actuate the feeds so that they are rendered active to feed their yarns for individual courses of the fabric in succession in a predetermined repeating sequence during rotary knitting of the stocking legs, and the other set of segments for similarly actuating the feeds during rotary knitting of the stocking insteps; and means for axially shifting the cam drum concurrently with shifting of the needle cylinder as aforesaid to effect substitution of the second mentioned set of its segments for the first so that the yarns of adjacent courses are caused to consistently overlap upon the special needles aforesaid.

5. A knitting machine for producing seamless ringless stockings comprising an annular series of needles; a plurality of independently-movable juxtaposed feeds for feeding as many individual main yarns of the same kind and nominal gauge; a rotating needle cylinder; a continuously rotating drum with circumferentially-staggered cam rises and depressions respectively of even lengths for controlling interchange of said feeds in a predetermined repeating sequence during the knitting of the tubular portions of the stockings; and means for positively driving the drum relative to the needle cylinder at a rate inversely proportional to the number of feeds so that one feed serves its yarn for one course of the knitting, another feed for the next course, and so on.

6. A knitting machine for producing seamless ringless stockings, according to claim 5, including means for diverting a selected group of lap needles from the normal path followed by the other needles at the yarn feeding point to insure taking of both the outgoing and incoming yarns by said lap needles at each interchange throughout the knitting.

7. A knitting machine for producing seamless ringless stockings comprising a cylinder with an annular series of needles; a drive shaft with interposed gear connections for rotating the needle cylinder; a plurality of independently movable juxtapositioned feeds for feeding as many individual main yarns of the same kind and nominal gauge; and a cam drum continuously rotated through a train of gears from the drive shaft relative to the needle cylinder at a rate inversely proportional to the number of feeds, said drum having circumferentially-staggered cam rises and recesses respectively of equal lengths for controlling interchange of the feeds in a predetermined repeating sequence so that one feed serves its yarn for one course of the knitting, another feed for the next course, and so on.

8. A knitting machine for producing seamless ringless stockings comprising a needle cylinder with an annular series of needles; means for rotating and oscillating the needle cylinder; a plurality of independently-movable main yarn feeds for feeding as many main yarns of the same kind and nominal gauge during the knitting of the leg and instep portions of the stockings; actuating fingers individually associated with said feeds; a continuously-rotating cam drum with staggeringly-arranged circumferential rises and depressions respectively of equal lengths and influential respectively upon said actuating fingers to control interchange of said feeds in a predetermined repeating sequence, means for positively driving the drum relative to the needle cylinder at a rate inversely proportional to the number of feeds so that one feed serves its yarn for one course of the knitting, another feed for the next course and so on; heel and toe yarn feeds; thrust bars respectively associated with the main yarn feeds and with the heel and toe yarn feeds; a timing drum influential upon the thrust bars to determine alternate active phases of the main yarn feeds and the heel and toe yarn feeds, there being cam lugs with offsets on said timing drum for the main yarn feeds so arranged as to insure restoration of the latter feeds for actuation by the control drum in the predetermined order aforesaid.

9. A knitting machine for producing seamless ringless stockings comprising an annular series of needles; a plurality of independent yarn feeds for feeding as many main yarns of the same kind and nominal gauge during the knitting of the tubular portions of the stockings; means for controlling interchange of said feeds in a predetermined repeating sequence so that one feed serves its yarn for one course of the knitting, another feed for the next course, and so on; means for tensioning said yarns during the knitting; a normally idle heel and toe yarn feed; clamping means for all the yarns; means for withdrawing the main yarn feeds and placing the heel and toe yarn feed into action when the heel and toe of the stocking is to be knit; and means for concurrently rendering ineffective the tensioning means to insure against withdrawal of the main yarns from the clamping means with the heel and toe yarn when the feed for the latter is placed in action.

10. A knitting machine for producing seamless ringless stockings, according to claim 9, wherein the tensioning means includes spring-pressed disk couples individual to and between which the main yarns are individually passed, and wherein wedge members are concurrently passed between the disks of the respective couples to relieve the main yarns when the feeds for them are withdrawn from action.

EUGENE F. MILLER.